US012601030B2

(12) United States Patent
Nishioka et al.

(10) Patent No.: US 12,601,030 B2
(45) Date of Patent: Apr. 14, 2026

(54) METHOD FOR PRODUCING REDUCED FORM OF METAL OXIDES

(71) Applicant: K.K. SUN METALON, Yokohama City (JP)

(72) Inventors: Kazuhiko Nishioka, Yokohama City (JP); Yuki Maeda, Yokohama City (JP); Kentaro Hori, Yokohama City (JP)

(73) Assignee: K.K. SUN METALON, Yokohama City (JP)

( * ) Notice: Subject to any disclaimer, the term of this patent is extended or adjusted under 35 U.S.C. 154(b) by 0 days.

(21) Appl. No.: 19/187,806

(22) Filed: Apr. 23, 2025

(65) Prior Publication Data

US 2025/0369069 A1 Dec. 4, 2025

(30) Foreign Application Priority Data

Apr. 25, 2024 (JP) ................................ 2024-071513

(51) Int. Cl.

| | |
|---|---|
| ***C22B 4/04*** | (2006.01) |
| ***B22F 9/20*** | (2006.01) |
| ***C01F 7/021*** | (2022.01) |
| ***C01G 49/06*** | (2006.01) |
| ***C01G 49/08*** | (2006.01) |
| ***C21B 13/12*** | (2006.01) |
| ***C22B 4/02*** | (2006.01) |

(Continued)

(52) U.S. Cl.

CPC .................. *C22B 4/04* (2013.01); *B22F 9/20* (2013.01); *C01F 7/021* (2013.01); *C01G 49/06* (2013.01); *C01G 49/08* (2013.01); *C21B 13/12* (2013.01); *C22B 4/02* (2013.01); *C22B 5/02* (2013.01); *C22B 21/0053* (2013.01); *B22F 2301/052* (2013.01); *B22F 2301/35* (2013.01); *B22F 2998/10* (2013.01)

(58) Field of Classification Search

CPC .... C22B 4/04; C22B 4/00; C22B 5/02; C01G 49/02

See application file for complete search history.

(56) References Cited

U.S. PATENT DOCUMENTS

| | | | | |
|---|---|---|---|---|
| 2023/0382755 | A1 * | 11/2023 | Arantes Araújo | ........ B03B 9/04 |
| 2024/0165700 | A1 | 5/2024 | Nishioka et al. | |
| 2024/0189902 | A1 | 6/2024 | Nishioka et al. | |

FOREIGN PATENT DOCUMENTS

| | | | | |
|---|---|---|---|---|
| JP | 2010-138023 | A | 6/2010 | |
| JP | 2011-184718 | A | 9/2011 | |
| WO | WO-0246482 | A1 * | 6/2002 | ............... C22B 5/02 |

(Continued)

OTHER PUBLICATIONS

JP 3774410 B2 machine translation and original document. (Year: 2006).*

(Continued)

*Primary Examiner* — Tima M. McGuthry-Banks

(74) *Attorney, Agent, or Firm* — Knobbe, Martens, Olson & Bear, LLP

(57) ABSTRACT

Provided is a method for producing a reduced form of a metal oxide, the method being capable of preventing the production of carbon dioxide. The method for producing a reduced form of a metal oxide may use a partition member and a high-melting-point material that comprises an absorbent material and an insulation material.

17 Claims, 8 Drawing Sheets

(51) Int. Cl.
*C22B 5/02* (2006.01)
*C22B 21/00* (2006.01)

(56) References Cited

FOREIGN PATENT DOCUMENTS

| | | | |
|---|---|---|---|
| WO | WO 2022/195989 | A1 | 9/2022 |
| WO | WO 2022/196681 | A1 | 9/2022 |

OTHER PUBLICATIONS

CN 102168170 A machine translation and original document. (Year: 2011).*
Amini, Ahmadreza, et al. Effect of the Ratio of Magnetite Particle Size to Microwave Penetration Depth on Reduction Reaction Behavior by H2. Scientific Reports. pp. 1-7. (Year: 2018).*
CN 116240378 A machine translation and original document. (Year: 2023).*
JP H0367998 U machine translation and original document. (Year: 1991).*
TW 201721952 A machine translation and original document. (Year: 2017).*

* cited by examiner

TEMPERATURE CHANGES DURING HEATING OF ALUMINUM OXIDE IN CONTACT WITH IRON OXIDE

METHOD FOR PRODUCING REDUCED FORM OF METAL OXIDES

TECHNICAL FIELD

Some aspects of the present invention relate to a method for producing a reduced form of a metal oxide.

BACKGROUND

The main component of iron ore is iron oxide, and therefore, in production of iron, iron oxide is generally reduced by carbon contained in coke. The reduction reaction of iron oxide is represented by the following formulas:

$$3Fe_2O_3 + CO \longrightarrow 2Fe_3O_4 + CO_2$$

$$Fe_3O_4 + CO \longrightarrow 3FeO + CO_2$$

$$FeO + CO \longrightarrow Fe + CO_2$$

As represented by the above formulas, carbon dioxide ($CO_2$) is produced in the conventional method for reducing iron oxide.

CITATION LIST

Patent Literature

Patent Literature 1: Japanese Patent Laid-Open No. 2010-138023
Patent Literature 2: Japanese Patent Laid-Open No. 2011-184718
Patent Literature 3: WO2022/195989
Patent Literature 4: WO2022/196681

SUMMARY OF INVENTION

Technical Problem

In reduction of metal oxides, which are not limited to iron oxide, it is desired to prevent the production of carbon dioxide. Accordingly, an object of some aspects of the present invention is to provide a method for producing a reduced form of a metal oxide, the method being capable of preventing the production of carbon dioxide.

Solution to Problem

A method for producing a reduced form of a metal oxide according to an aspect of the present invention comprises irradiating a metal oxide and a high-melting-point material that is not in contact with the metal oxide with electromagnetic waves that are at least one of microwaves and millimeter waves to reduce at least a portion of the metal oxide, wherein a partition member is placed between the metal oxide and the high-melting-point material, the high-melting-point material has a melting point higher than the melting point of the metal oxide, and the high-melting-point material comprises an absorbent material that absorbs the electromagnetic waves in a temperature range that is at least partially lower than a temperature range in which the metal oxide absorbs the electromagnetic waves.

In the reduction of at least a portion of the metal oxide in the above method for producing a reduced form of a metal oxide, a carbon-containing reducing agent may not be brought into contact with the metal oxide. The carbon-containing reducing agent may be a gas, a liquid, or a solid.

In the reduction of at least a portion of the metal oxide in the above method for producing a reduced form of a metal oxide, carbon monoxide (CO) may not be supplied to the metal oxide.

In the above method for producing a reduced form of a metal oxide, the metal oxide may be a powder.

In the reduction of at least a portion of the metal oxide in the above method for producing a reduced form of a metal oxide, the partition member may be a container, the metal oxide may be placed inside the container, and the high-melting-point material may be placed outside the container.

In the reduction of at least a portion of the metal oxide in the above method for producing a reduced form of a metal oxide, the partition member may be a container, the high-melting-point material may be placed inside the container, and the metal oxide may be placed outside the container.

In the above method for producing a reduced form of a metal oxide, the container may be a crucible.

In the above method for producing a reduced form of a metal oxide, the metal oxide may be iron oxide.

In the above method for producing a reduced form of a metal oxide, the iron oxide may be at least one selected from iron(III) oxide ($Fe_2O_3$), triiron tetraoxide ($Fe_3O_4$), and iron (II) oxide (FeO).

In the above method for producing a reduced form of a metal oxide, the iron oxide may be iron(III) oxide ($Fe_2O_3$).

In the above method for producing a reduced form of a metal oxide, the absorbent material may comprise a carbon material.

In the above method for producing a reduced form of a metal oxide, the high-melting-point material may further comprise an insulation material that has a lower degree of absorption of the electromagnetic waves than the metal oxide.

In the above method for producing a reduced form of a metal oxide, the insulation material may comprise an oxide.

In the above method for producing a reduced form of a metal oxide, the high-melting-point material may be contained in a mold.

In the above method for producing a reduced form of a metal oxide, the high-melting-point material may be a powder.

A method for reducing oxidized metal according to an aspect of the present invention comprises irradiating a metal oxide and a high-melting-point material that is not in contact with the metal oxide with electromagnetic waves that are at least one of microwaves and millimeter waves to reduce at least a portion of the metal oxide, wherein a partition member is placed between the metal oxide and the high-melting-point material, the high-melting-point material has a melting point higher than the melting point of the metal oxide, and the high-melting-point material comprises an absorbent material mixture that absorbs the electromagnetic waves in a temperature range that is at least partially lower than a temperature range in which the metal oxide absorbs the electromagnetic waves.

In the reduction of at least a portion of the metal oxide in the above method for reducing oxidized metal, a carbon-containing reducing agent may not be brought into contact with the metal oxide. The carbon-containing reducing agent may be a gas, a liquid, or a solid.

In the reduction of at least a portion of the metal oxide in the above method for reducing oxidized metal, carbon monoxide (CO) may not be supplied to the metal oxide.

In the above method for reducing oxidized metal, the metal oxide may be a powder.

In the reduction of at least a portion of the metal oxide in the above method for reducing oxidized metal, the partition member may be at least a portion of the container, the metal oxide may be placed inside the container, and the high-melting-point material may be placed outside the container.

In the reduction of at least a portion of the metal oxide in the above method for reducing oxidized metal, the partition member may be at least a portion of the container, the high-melting-point material may be placed inside the container, and the metal oxide may be placed outside the container.

In the above method for reducing oxidized metal, the container may be a crucible.

In the above method for reducing oxidized metal, the metal oxide may be iron oxide.

In the above method for reducing oxidized metal, the iron oxide may be at least one selected from iron(III) oxide ($Fe_2O_3$), triiron tetraoxide ($Fe_3O_4$), and iron(II) oxide (FeO).

In the above method for reducing oxidized metal, the iron oxide may be iron(III) oxide ($Fe_2O_3$).

In the above method for reducing oxidized metal, the absorbent material may comprise a carbon material.

In the above method for reducing oxidized metal, the high-melting-point material may further comprise an insulation material that has a lower degree of absorption of the electromagnetic waves than the metal oxide.

In the above method for reducing oxidized metal, the insulation material may comprise an oxide.

In the above method for reducing oxidized metal, the high-melting-point material may be contained in a mold.

In the above method for reducing oxidized metal, the high-melting-point material may be a powder.

A method for producing a reduced form of a metal oxide according to an aspect of the present invention comprises placing a partition member between a metal oxide to be reduced and a high-melting-point material comprising an insulation material and an absorbent material that absorbs electromagnetic waves in a temperature range lower than an electromagnetic wave absorption rate change temperature range of the metal oxide; and irradiating the metal oxide, the high-melting-point material, and the partition member with electromagnetic waves to heat the high-melting-point material and the metal oxide, thereby causing the metal oxide to undergo a reduction reaction.

In the above method for producing a reduced form of a metal oxide, the partition member may be at least a portion of a first container, at least one of the metal oxide to be reduced and the high-melting-point material may be placed inside the first container, and the other may be placed outside the first container, the first container, the metal oxide, and the high-melting-point material may be placed inside a second container, and the electromagnetic waves may be applied from the outside of the second container to heat the high-melting-point material and the metal oxide, thereby causing the metal oxide to undergo a reduction reaction.

In the above method for producing a reduced form of a metal oxide, the metal oxide may be placed inside the first container, and the high-melting-point material may be placed outside the first container.

In the above method for producing a reduced form of a metal oxide, at least a portion of the metal oxide may be coated with a powder.

In the above method for producing a reduced form of a metal oxide, the powder may comprise aluminum oxide.

In the above method for producing a reduced form of a metal oxide, the absorbent material may comprise a carbon material.

In the above method for producing a reduced form of a metal oxide, the metal oxide may be hematite, and the reduced form may be magnetite.

In the above method for producing a reduced form of a metal oxide, the temperature of the metal oxide may be measured, and the irradiation with the electromagnetic waves may be stopped when the temperature stops rising.

Advantageous Effect of Invention

According to some aspects of the present invention, it is possible to provide a method for producing a reduced form of a metal oxide, the method being capable of preventing the production of carbon dioxide.

DESCRIPTION OF EMBODIMENTS

Figure 1:
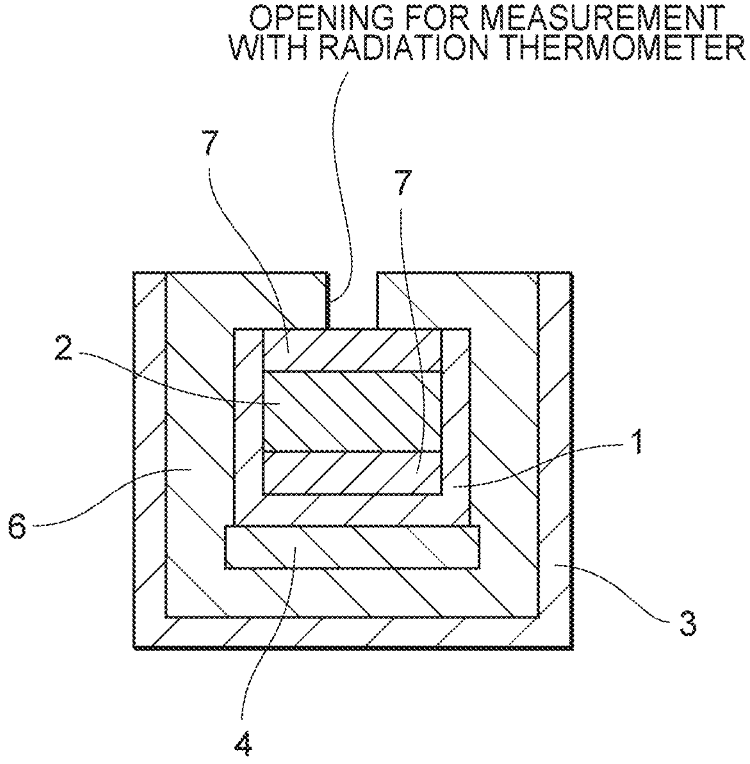
FIG. 1 is a schematic diagram showing an example of the arrangement of a metal oxide and a high-melting-point material according to an embodiment.

An embodiment and Examples of the present invention will be described below with reference to the drawings. However, the drawings are schematic. Therefore, specific dimensions and the like should be determined by referring to the following description. Needless to say, there are parts with different dimensional relationships and ratios between the drawings.

A method for producing a reduced form of a metal oxide according to the embodiment includes irradiating a metal oxide and a high-melting-point material that is not in contact with the metal oxide with electromagnetic waves that are at least one of microwaves and millimeter waves to reduce at least a portion of the metal oxide. A partition member is placed between the metal oxide and the high-melting-point material. The microwaves are, for example, electromagnetic waves with a frequency of 300 MHz or more and 30 GHz or less. The millimeter waves are, for example, electromagnetic waves with a frequency of 30 GHz or more and 300 GHz or less. In the following, the electromagnetic waves refer to at least one of microwaves and millimeter waves. In the method for producing a reduced form of a metal oxide according to the embodiment, the melting point of the high-melting-point material is higher than the melting point of the metal oxide. Further, the high-melting-point material contains an absorbent material that absorbs the electromagnetic waves in a temperature range that is at least partially lower than a temperature range in which the metal oxide absorbs the electromagnetic waves.

Examples of the metal oxide to be reduced include iron oxide, nickel oxide, copper oxide, gold oxide, silver oxide, aluminum oxide, cobalt oxide, tungsten oxide, titanium oxide, chromium oxide, molybdenum oxide, beryllium oxide, magnesium oxide, tin oxide, cerium oxide, lead oxide, mercury oxide, sodium oxide, bismuth oxide, and gallium oxide.

Examples of the iron oxide include iron(III) oxide ($Fe_2O_3$), triiron tetraoxide ($Fe_3O_4$), and iron(II) oxide (FeO). When iron(III) oxide ($Fe_2O_3$) is reduced, triiron tetraoxide ($Fe_3O_4$) is obtained. When triiron tetraoxide ($Fe_3O_4$) is reduced, iron(II) oxide (FeO) is obtained. When iron(II) oxide (FeO) is reduced, iron (Fe) is obtained. Iron(III) oxide ($Fe_2O_3$) is also referred to as hematite and ferric oxide. Triiron tetraoxide ($Fe_3O_4$) is also referred to as magnetite and ferrosoferric oxide. Iron(II) oxide (FeO) is also referred to as wustite and ferrous oxide.

The metal oxide may not be reduced to a metal that is not oxidized at all. For example, iron(III) oxide ($Fe_2O_3$) may not be reduced to iron (Fe). For example, iron (III) oxide ($Fe_2O_3$) may be reduced to obtain triiron tetraoxide ($Fe_3O_4$). Since triiron tetraoxide ($Fe_3O_4$) has magnetism, when iron (III) oxide ($Fe_2O_3$) contains impurities, it is possible to reduce iron(III) oxide ($Fe_2O_3$) to triiron tetraoxide ($Fe_3O_4$), and then separate the triiron tetraoxide ($Fe_3O_4$) from the impurities by magnetic force. As described above, the reduction of iron(III) oxide ($Fe_2O_3$) to iron (Fe) requires a three-step reaction. Even if the first or second reaction of the three-step reaction is performed by the reduction method according to the present embodiment, it is possible to prevent the production of carbon dioxide.

The metal oxide to be reduced may contain one type of metal, or may contain a plurality of types of metals. The metal oxide to be reduced may be an alloy. The metal oxide to be reduced may contain, as an alloy component, for example, silicon, manganese, chromium, nickel, boron, copper, aluminum, titanium, niobium, vanadium, zinc, antimony, palladium, lanthanum, gold, potassium, cadmium, indium, molybdenum, or sulfur.

The shape of the metal oxide to be reduced is not particularly limited. The metal oxide may be fractions. The metal oxide fractions may be, for example, metal oxide sections, metal oxide fragments, metal oxide chips, metal oxide shavings, or metal oxide powder. The metal oxide may be an aggregate of metal oxide fractions. The metal oxide to be reduced may be a molded body of a plurality of metal oxide fractions. For example, a molded body of the metal oxide may be produced by placing a plurality of metal oxide fractions in a mold, and applying pressure to the metal oxide fractions. The molded body may be a briquette. The molded body may be disc-shaped, but is not limited thereto. The pressure applied to a plurality of metal oxide fractions is not limited, but is, for example, 1 MPa or more, 100 MPa or more, or 200 MPa or more, and 2000 MPa or less, 1900 MPa or less, or 1800 MPa or less. Examples of the pressurization method include uniaxial molding, cold isostatic pressing (CIP) molding, hot isostatic pressing (HIP) molding, roller pressurization, and the like.

The absorbent material contained in the high-melting-point material has a melting point higher than the melting point of the metal oxide to be reduced. The temperature range in which the absorbent material absorbs electromagnetic waves is at least partially lower than the temperature range in which the metal oxide to be reduced absorbs electromagnetic waves. It is desirable that the absorbent material contained in the high-melting-point material has absorption rate peaks in a temperature range lower than an absorption rate change temperature range of the metal oxide to be reduced, and does not absorb much electromagnetic waves in the temperature range in which the metal oxide to be reduced absorbs electromagnetic waves. The absorption rate change temperature range is a temperature range in which the electromagnetic wave absorption rate of the metal oxide to be reduced changes. In general, metal oxides have a low electromagnetic wave absorption rate at a temperature lower than the absorption rate change temperature range, and have a high electromagnetic wave absorption rate at a temperature higher than the absorption rate change temperature range. The temperature range in which the metal oxide to be reduced absorbs electromagnetic waves is, for example, 300° C. or higher and 3000° C. or lower, 300° C. or higher and 2500° C. or lower, 300° C. or higher and 1200° C. or lower, 450° C. or higher and 1100° C. or lower, or 600° C. or higher and 800° C. or lower. The temperature range in which the absorbent material absorbs electromagnetic waves is, for example, 50° C. or higher and 1000° C. or lower, 100° C. or higher and 1000° C. or lower, 250° C. or higher and 900° C. or lower, or 300° C. or higher and 600° C. or lower. When the absorbent material is a substance that has such a temperature range in which electromagnetic waves are absorbed, many types of metal oxides can be suitably used. In particular, in an example of the present embodiment, hematite, which is iron oxide, is used as the metal oxide, and the absorption rate change temperature range of hematite is about 400° C. As described below, hematite and its reduced form are heated to over 1200° C. by electromagnetic waves; thus, the absorbent material is preferably a substance that has a temperature range in which electromagnetic waves are absorbed at 300° C. or higher and 600° C. or lower.

The temperature range in which the absorbent material absorbs electromagnetic waves preferably at least partially overlaps with the temperature range in which the metal oxide to be reduced absorbs electromagnetic waves. Since the absorbent material absorbs electromagnetic waves in a temperature range at least partially lower than the temperature range in which the metal oxide to be reduced absorbs electromagnetic waves, the absorbent material generates heat earlier than the metal oxide to be reduced. Therefore, the absorbent material can promote the heating of the metal oxide to be reduced until it reaches the temperature range in which the metal oxide to be reduced absorbs electromagnetic waves. Accordingly, when the high-melting-point material contains the absorbent material, the temperature of the metal oxide to be reduced is faster to reach the temperature range in which electromagnetic waves are absorbed, making it possible to reduce the heating time of the metal oxide to be reduced. In addition, since the absorbent material absorbs electromagnetic waves in a temperature range at least partially lower than the temperature range in which the metal oxide to be reduced absorbs electromagnetic waves, it is possible to prevent the high-melting-point material from being heated more than necessary. Therefore, when the high-melting-point material has a specific shape, the high-melting-point material can have a stable shape while the metal to be heated irradiated with electromagnetic waves is heated.

As described above, it is preferable for the absorbent material to have the characteristics of absorbing electromagnetic waves in a temperature range lower than the absorption rate change temperature range of the metal oxide, and to have a melting point higher than that of the metal oxide. As a material having such characteristics, the absorbent material contains a carbon material, for example. Preferred examples of the carbon material include, but are not particularly limited to, carbon black, amorphous carbon, graphite, silicon carbide, carbon resin, and metal carbide. The absorbent material may contain metal, metal nitride, metal oxide, metal boride, and the like that absorb electromagnetic waves in a temperature range at least partially lower than the temperature range in which the metal oxide to be reduced absorbs electromagnetic waves. The absorbent material may be a compound of these. The carbon material contained in the high-melting-point material is not in contact with the metal oxide to be reduced, and thus does not function as a reducing agent for the metal oxide to be reduced.

The high-melting-point material may further contain an insulation material that has a lower degree of absorption of electromagnetic waves than the metal oxide. For example, the insulation material is more permeable to electromagnetic waves than the metal oxide to be reduced, and has a lower degree of absorption of electromagnetic waves than the metal oxide to be reduced. The insulation material has a melting point higher than the melting point of the metal oxide to be reduced. The insulation material, which has a lower degree of absorption of electromagnetic waves, is less likely to generate heat even when irradiated with electromagnetic waves, and exhibits an insulation effect. Further, the insulation material, which has a melting point higher than that of the metal oxide to be reduced, has a stable shape even when irradiated with electromagnetic waves. Therefore, when the high-melting-point material has a specific shape, the high-melting-point material containing the insulation material can have a stable shape while the metal to be heated irradiated with electromagnetic waves is heated.

The insulation material may contain an oxide. The insulation material may contain an oxide of a metal or an oxide of a semi-metal. Examples of oxides of metals and semi-metals include, but are not particularly limited to, aluminum oxide, silicon oxide, magnesium oxide, zirconium oxide, and titanium oxide. For example, the melting point of aluminum oxide is 2072° C. The melting point of silicon oxide is 1710° C. The melting point of magnesium oxide is 2852° C. The insulation material may be a compound of these.

The high-melting-point material may be a mixture of the absorbent material and the insulation material. The absorbent material and the insulation material are preferably uniformly distributed in the high-melting-point material. The high-melting-point material may be a powder or a molded body. The high-melting-point material may be contained in a mold. The high-melting-point material as a molded body may be obtained by solidifying the absorbent material and the insulation material, which are powders, using a binder. The high-melting-point material as a molded body may be obtained by solidifying a mixture of the absorbent material and the insulation material, which are powders, using a binder.

The partition member is placed between the metal oxide and the high-melting-point material so that the metal oxide is not in contact with the high-melting-point material. The partition member preferably does not contain a substance containing carbon. The partition member prevents the transfer of substances containing carbon. The partition member preferably prevents the transfer of gas. The thermal conductivity of the partition member is preferably high so that the heat of the high-melting-point material can be transferred to the metal oxide. The electromagnetic wave absorption efficiency of the partition member is preferably less than the electromagnetic wave absorption efficiency of the metal oxide so that the metal oxide can efficiently absorb electromagnetic waves. The dielectric loss of the partition member is preferably low so that the metal oxide can efficiently absorb electromagnetic waves. The material for the partition member is preferably a material that is not reduced by the high-melting-point material and that does not produce carbon dioxide at a temperature at which the metal oxide to be reduced is reduced. The material for the partition member is, for example, an oxide of a metal different from the metal oxide to be reduced. When the metal oxide to be reduced is iron oxide, the material for the partition member is, for example, aluminum oxide ($Al_2O_3$). The temperature at which iron oxide is reduced is, for example, from 400° C. to 500° C., whereas the temperature at which aluminum oxide is reduced is 2000° C. or higher. Accordingly, if the electromagnetic wave conditions are set to a temperature at which aluminum oxide is not reduced while iron oxide is reduced, aluminum oxide, which is in contact with the high-melting-point material, is not reduced while iron oxide is reduced, and carbon dioxide is not produced. Other examples of the material for the partition member include silicon nitride ($Si_3N_4$), aluminum nitride (AlN), and zirconia ($ZrO_2$).

The partition member may be a container. The metal oxide may be placed inside the container, and the high-melting-point material may be placed outside the container. The container may be a crucible. The irradiation of the metal oxide and high-melting-point material with electromagnetic waves may be carried out in an inert gas atmosphere. Examples of the inert gas include argon (Ar) and helium (He). The irradiation of the metal oxide and high-melting-point material with electromagnetic waves may also be carried out in a neutral gas atmosphere. Examples of the neutral gas include nitrogen ($N_2$). The irradiation of the metal oxide and high-melting-point material with electromagnetic waves may also be carried out in a carbon-free reducing gas atmosphere. Examples of the carbon-free reducing gas include hydrogen ($H_2$) and ammonia ($NH_3$). Since hydrogen does not contain carbon, carbon dioxide is not produced even if hydrogen functions as a reducing agent. Further, when hydrogen is present, a synergistic effect with the high-melting-point material promotes the reduction of the metal oxide. Ammonia is decomposed by heat into nitrogen and hydrogen. Therefore, when ammonia is present, hydrogen is produced and can function as a reducing agent. The irradiation of the metal oxide and high-melting-point material with electromagnetic waves may be carried out under vacuum.

When the method for producing a reduced form of a metal oxide according to the embodiment is performed, for example, as shown in FIG. 1, the metal oxide 2 to be reduced is placed in the first container 1, such as the crucible. A powder 7 may be placed above and below the metal oxide 2. The high-melting-point material 4 and the insulation material 6 are placed in a second container 3, such as a crucible, larger than the first container 1. Next, the first container 1 with the metal oxide 2 therein is placed in the second container 3 with the high-melting-point material 4 and the insulation material 6 therein. The first container 1 functions as the partition member to separate the metal oxide 2 and the high-melting-point material 4. In order to prevent the scattering of the high-melting-point material 4 of FIG. 6, a portion where the high-melting-point material 4 is exposed at the opening of the second container 3 may be covered with a lid 5, such as a plate. The lid 5 is more preferably a material with high gas permeability so that desorbed oxygen plasma or oxygen molecules do not return to and recombine with the metal oxide. The partition member may not be in contact with the metal oxide 2 as long as the metal oxide 2 can be separated from the high-melting-point material 4. The arrangement of the metal oxide 2 and the high-melting-point material 4 may be reversed. Specifically, the high-melting-point material 4 may be placed in the first container 1, and the metal oxide 2 may be arranged around the first container 1.

The powder 7 below the metal oxide 2 to be reduced in the first container 1 may be placed in the first container 1 in order to prevent the metal oxide 2 from coming into contact with the high-melting-point material 4 if the first container 1 is broken. The powder 7 above the metal oxide 2 in the first container 1 may be placed in order to reduce the opportunity for contact between the reduced form of the metal oxide 2 and oxygen in the gas. The powder 7 may or may not be placed. The powder 7 is, for example, a metal or metal oxide that has a melting point higher than that of the metal oxide 2 to be reduced. The powder 7 is, for example, an aluminum oxide powder. When the metal oxide to be reduced is iron oxide, aluminum oxide binds to oxygen more strongly than the iron oxide to be reduced, and hardly releases oxygen plasma or oxygen molecules faster than the iron oxide to be reduced.

Figure 2:
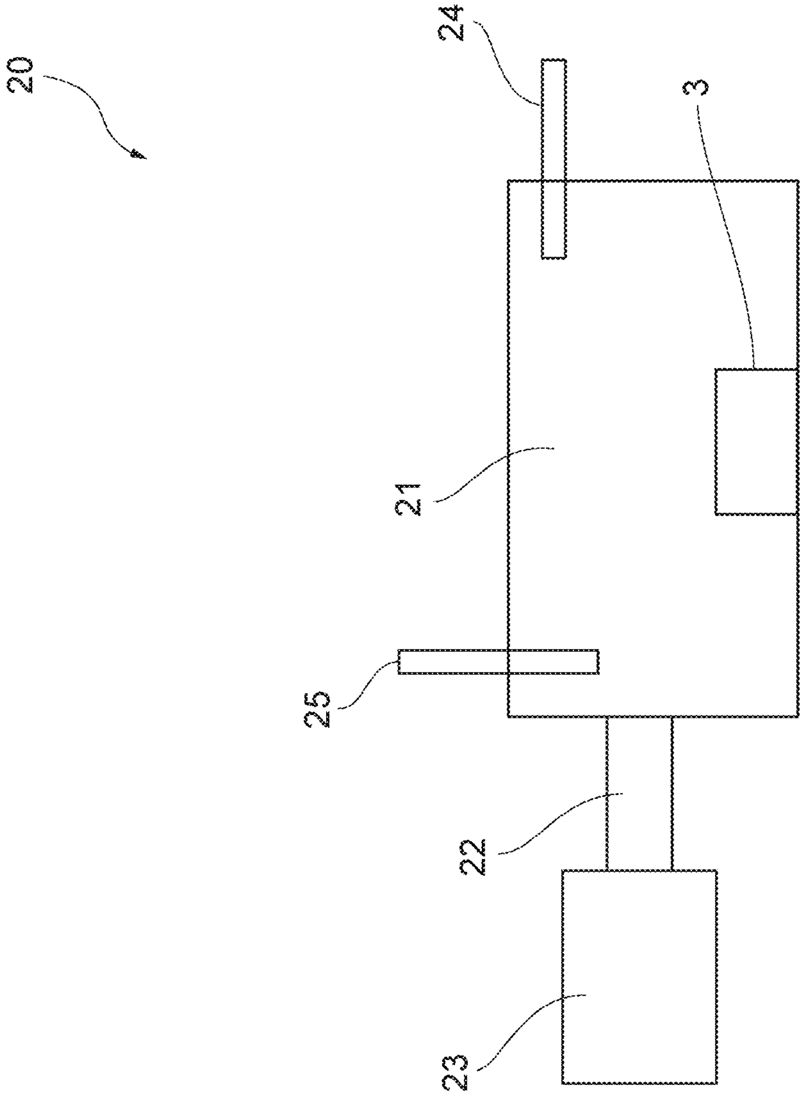
FIG. 2 is a schematic diagram of an electromagnetic wave applicator according to an embodiment.

Next, the second container 3 with the metal oxide 2, the first container 1, and the high-melting-point material 4 therein is placed in the chamber 21 of the electromagnetic wave applicator 20 shown in FIG. 2. The chamber 21 is closed, and electromagnetic waves are applied into the chamber 21 through a waveguide 22 from an oscillator 23. The high-melting-point material 4 irradiated with the electromagnetic waves generates heat to promote the heating of the metal oxide 2. After the self-heating of the metal oxide 2 starts, the partition member and the high-melting-point material 4 may be removed. The heated metal oxide 2 is reduced by heating, even without using a reducing agent. Before the electromagnetic waves are applied into the chamber 21, and while the electromagnetic waves are applied into the chamber 21, an inert gas, neutral gas, or carbon-free reducing gas may be introduced into the chamber 21 through an inlet pipe 24. Further, before the electromagnetic waves are applied into the chamber 21, and while the electromagnetic waves are applied into the chamber 21, the gas inside the chamber 21 may be discharged to the outside of the chamber 21 through an outlet pipe 25.

In the present embodiment, the temperature increase from room temperature to the absorption rate change temperature range is mainly caused by thermal transfer from the high-melting-point material to the metal oxide, and it is thus better to place the high-melting-point material and the metal oxide as close as possible. As industrially easily available and inexpensive materials that satisfy the requirements that they have electromagnetic wave absorption rate peaks at a temperature below the absorption rate change temperature range and have a melting point higher than that of the metal oxide, carbon materials as described above are preferred. However, when a carbon material is used as the absorbent material and placed in contact with the metal oxide, the carbon strongly acts as a reducing agent and binds to the oxygen atoms compounded with the metal oxide, which results in the advantage of fast reduction; however, the carbon binds to the oxygen released from the metal oxide to produce a large amount of carbon dioxide. In contrast, with the method for producing a reduced form of a metal oxide according to the present embodiment, even if the high-melting-point material contains a carbon material, the metal oxide and the high-melting-point material are separated by the partition member and are not in contact with each other during irradiation with electromagnetic waves; thus, the oxygen contained in the metal oxide and the carbon contained in the high-melting-point material do not react to produce carbon dioxide. Therefore, the method for producing a reduced form of a metal oxide according to the embodiment makes it possible to prevent the production of carbon dioxide. Further, as shown in the Examples provided below, the method for producing a reduced form of a metal oxide according to the embodiment makes it possible to reduce a metal oxide without bringing a reducing agent containing carbon into contact with the metal oxide to be reduced. In addition, the method for producing a reduced form of a metal oxide according to the embodiment makes it possible to reduce a metal oxide without supplying a reducing gas, such as carbon monoxide (CO) or hydrocarbon gas ($CH_4$, $C_3H_8$, $C_4H_{10}$, etc.), to the metal oxide to be reduced.

Example 1

10 g of iron oxide powder (hematite, $Fe_2O_3$, Kojundo Chemical Lab. Co., Ltd., purity: 99.9%, particle size: <1 μm) was prepared as a sample, an aluminum oxide ($Al_2O_3$) powder, an iron oxide powder (hematite, $Fe_2O_3$), and an aluminum oxide ($Al_2O_3$) powder were placed in this order in a small crucible made of aluminum oxide ($Al_2O_3$) so that each of them was not mixed. In addition, a high-melting-point material containing silicon carbide (SiC) as an absorbent material and aluminum oxide ($Al_2O_3$) as an insulation material was prepared. Further, an insulation material, the small crucible, and the high-melting-point material were placed in a large crucible made of aluminum oxide ($Al_2O_3$), and while the high-melting-point material was in contact with the bottom of the small crucible, the periphery of the small crucible was covered with the insulation material. The sample was separated from the high-melting-point material by the small crucible. The top of the large crucible was covered with an insulation material with a hole for measurement with a radiation thermometer. The aluminum oxide powder below the iron oxide powder in the small crucible was placed in the small crucible in order to prevent the iron oxide from coming into contact with the high-melting-point material if the crucible was broken. The aluminum oxide powder above the iron oxide powder in the small crucible was placed in order to reduce the opportunity for contact between the reduced form of the iron oxide and oxygen in the gas.

Figure 3:
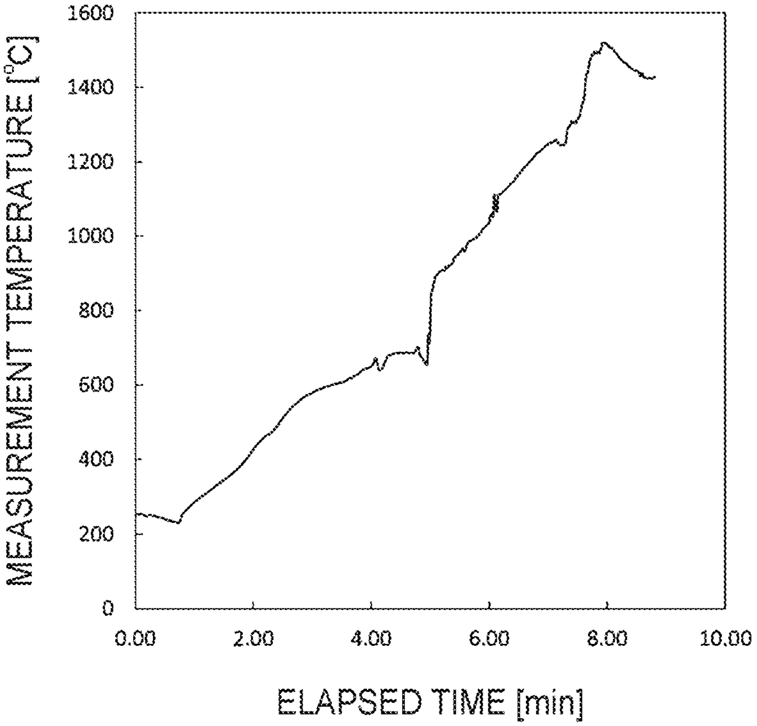
FIG. 3 is a graph showing the temperature changes of a sample according to Example 1.
Figure 4:
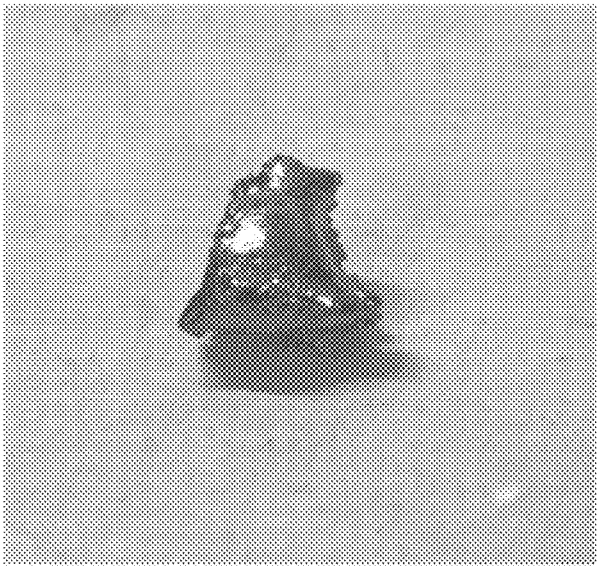
FIG. 4 is a photograph showing a reduced sample according to Example 1.

Next, the large crucible was placed in the chamber of a microwave applicator, and microwaves with a frequency of 2.45 GHz and an output of 1.7 kW were applied to the large crucible. The temperature of the sample within the large crucible was measured with a radiation thermometer. As shown in FIG. 3, for about 4 minutes after microwave irradiation was started, the temperature of the sample rose rapidly from about 600° C. to about 1400° C., and finally reached 1600° C. FIG. 4 shows a photograph of the sample collected after that. The sample was sintered, and its color was black.

Figure 5:
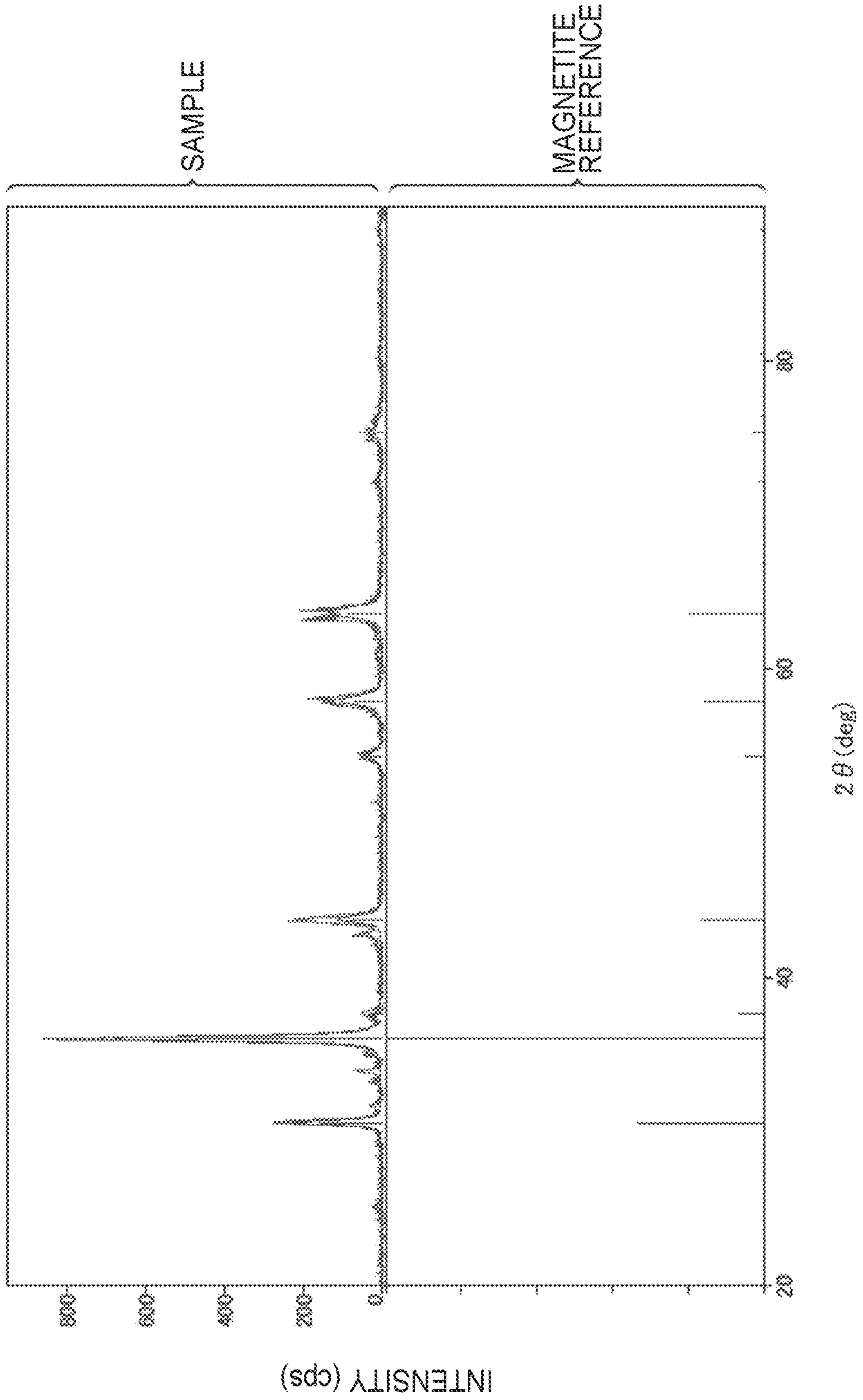
FIG. 5 is a graph showing X-ray diffraction peaks of the reduced sample according to Example 1.

When the collected sample was analyzed by an X-ray diffractometer (Ultima IV, Rigaku Corporation), peaks that matched the X-ray diffraction peaks of magnetite ($Fe_3O_4$) were observed in the sample as shown in FIG. 5, and the sample was identified as 100% magnetite ($Fe_3O_4$) from the X-ray diffraction intensity. Therefore, it was confirmed that hematite ($Fe_2O_3$) was reduced to magnetite ($Fe_3O_4$) by microwave irradiation without coming into contact with carbon monoxide (CO) or a carbon-containing reducing agent. In this Example, hematite was not in contact with a carbon-containing reducing agent; thus, theoretically, hematite could be reduced to magnetite without producing carbon dioxide.

According to this Example, the metal oxide could be reduced by only a few minutes of microwave irradiation without using a reducing agent. The reducing agent is mainly a carbon-containing substance that takes out oxygen atoms bound in the metal oxide in the form of carbon dioxide. In this Example, reduction occurs without using such a reducing agent, and no carbon dioxide is thus discharged from the metal oxide. In this Example, reduction proceeded to magnetite, and no wustite or pure iron was detected. It is considered that microwave heating microscopically dissociated the oxygen atoms beyond the oxygen binding energy of hematite and released them in the form of plasma or oxygen molecules outside the metal oxide, resulting in magnetite, which was not reduced to wustite or pure iron because the oxygen binding energy of magnetite was not exceeded. However, it is considered that reduction to wustite or pure iron is possible by increasing the energy of the electromagnetic waves. Many metals are present as mixtures of metal elements and oxygen elements in various mixing ratios depending on the degree of oxidation. In this Example, metal oxides can be reduced to any desired degree by irradiation with optimal electromagnetic wave energy. In particular, in this Example, non-magnetic hematite is reduced to magnetic magnetite, which is industrially more valuable, and the reduction stops at that level; thus, it is particularly valuable. Although the reduction was stopped at the magnetite level in this Example, the reduction may be further promoted by increasing the energy of the electromagnetic waves applied, or the container separating the metal oxide to be reduced and the absorbent material may be removed at this stage, and the reduction may be promoted by a stronger reduction action by bringing the carbon material contained in the absorbent material into contact with the metal oxide.

Example 2

Figure 6:
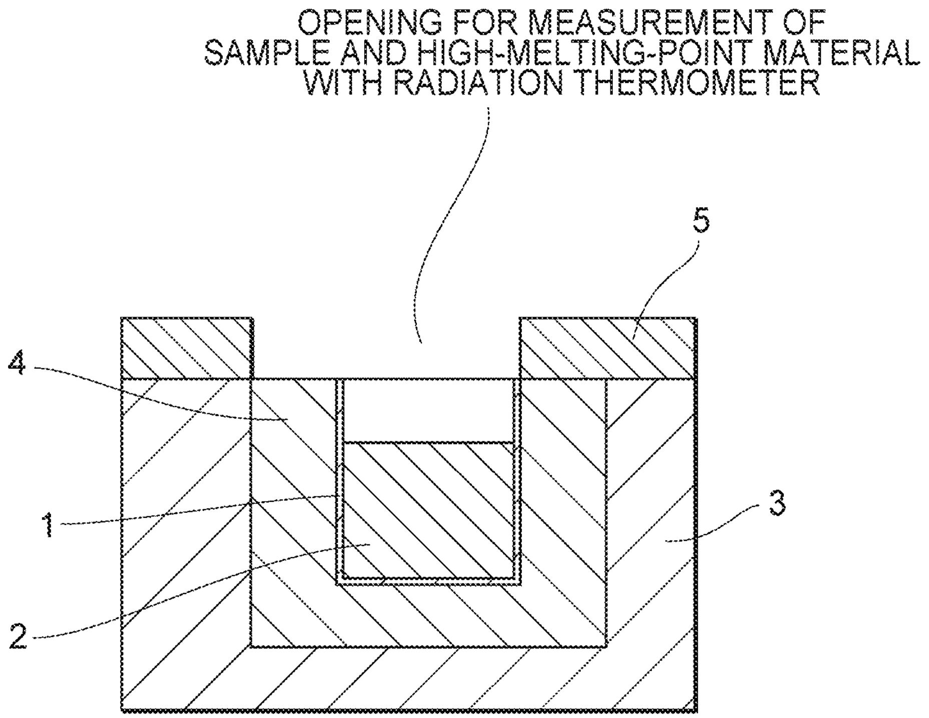
FIG. 6 is a schematic diagram of an electromagnetic wave applicator according to Example 2.
Figure 7:
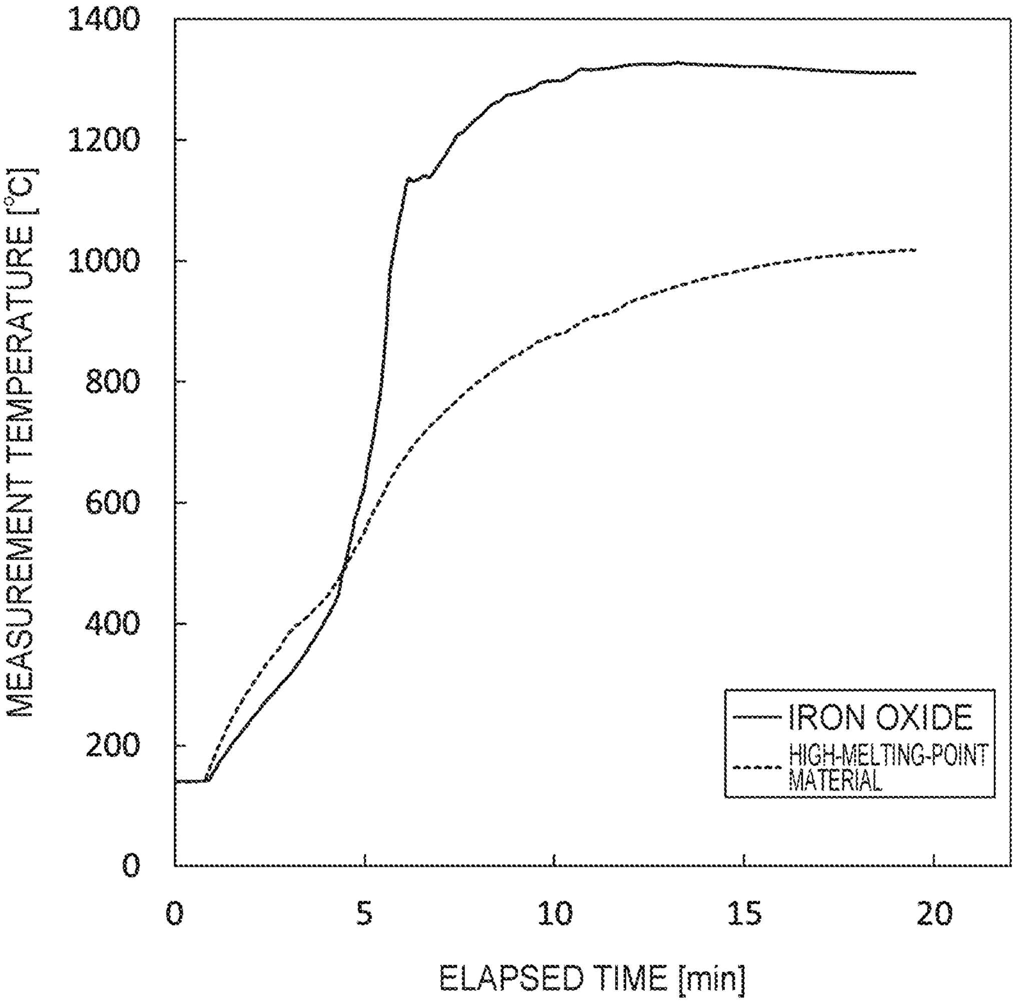
FIG. 7 is a graph showing the temperature changes of a high-melting-point material and a sample according to Example 2.

As shown in FIG. 6, hematite ($Fe_2O_3$) as a metal oxide 2 to be reduced was placed in a first container 1, which was a crucible. Further, the first container 1 with the oxidized metal 2 therein was placed in a second container 3, which was a crucible larger than the first container 1, so that the first container was covered with a high-melting-point material 4. In order to prevent the scattering of the high-melting-point material 4, a portion where the high-melting-point material 4 was exposed at the opening of the second container 3 was covered with a lid 5, which was an aluminum oxide plate. The lid 5 was provided with a temperature-measuring hole. While the sample was irradiated with microwaves, the temperature of the metal oxide 2 to be reduced was measured with a radiation thermometer. Other than the above, the sample was irradiated with microwaves in the same manner as in Example 1. As shown in FIG. 7, for about 4 minutes after microwave irradiation was started, the temperature of the high-melting-point material rose faster than the sample. This suggests that the electromagnetic wave absorption rate of the absorbent material used in this Example at 450° C. or lower is higher than that of the metal oxide. After about 4 minutes, when the temperature exceeded 450° C., the temperature of the sample rose rapidly and became higher than the temperature of the high-melting-point material, as explained in Example 1. This is because the metal oxide absorbs more electromagnetic waves at around 500° C., which is the absorption rate change temperature range of the metal oxide, and the metal oxide is heated faster than the absorbent material. The temperature rise curve of the sample becomes steeper from this point, and the temperature rose rapidly to about 1150° C. by the time about 7 minutes had elapsed. This suggests that at least a portion of the sample was converted into magnetic magnetite, and that the self-heating of magnetite started due to the magnetic field. Thereafter, the temperature of the high-melting-point material continued to rise gradually, and no longer increased at about 1350° C. The reason for this is assumed to be because most of the hematite sample was reduced to magnetite, the electromagnetic wave absorption rate of magnetite decreased at 1350° C., and heating by electromagnetic waves and radiation of heat to the surroundings were in equilibrium. It was confirmed by X-ray diffraction that the sample collected in Example 2 was also reduced to magnetite ($Fe_3O_4$). Before the temperature of the sample exceeds the temperature of the high-melting-point material, the reduction of the sample is considered to be ongoing. As in this Example, the temperature of the absorbent material occurs first, and the temperature of the metal oxide rises above the temperature of the absorbent material in the process, suggesting that the absorbent material first absorbs electromagnetic waves and its temperature rises first, and that the temperature of the metal oxide rises due to radiation or heat transfer and exceeds the absorption rate change temperature range, after which the metal oxide mainly absorbs electromagnetic waves, and the temperature of the absorbing material rather rises due to radiation or heat transfer from the metal oxide. As the absorbent material used in this Example, it is advisable to select a substance whose temperature rises earlier than the metal oxide when irradiated with the electromagnetic waves used, and whose temperature rise is lower than that of the metal oxide after the absorption rate change temperature range is exceeded. If the radiation of electromagnetic waves continues until the temperature rise of the metal oxide to be reduced reaches its peak, which in this Example is 12 minutes later and a measurement temperature of 1350° C., it can be estimated that hematite has been sufficiently reduced to magnetite.

The results of Example 2 indicate that for about 4 minutes after microwave irradiation was started, the high-melting-point material absorbed more microwaves than the sample, the temperature of the high-melting-point material rose earlier than the sample, and the temperature of the high-melting-point material was transmitted to the sample through the crucible. It is also indicated that after about 4 minutes since microwave irradiation started, due to the conversion of the sample from hematite into magnetic magnetite, the microwave absorption efficiency of the sample was rapidly increased, and the sample was self-heated.

Comparative Example 1

Figure 8:
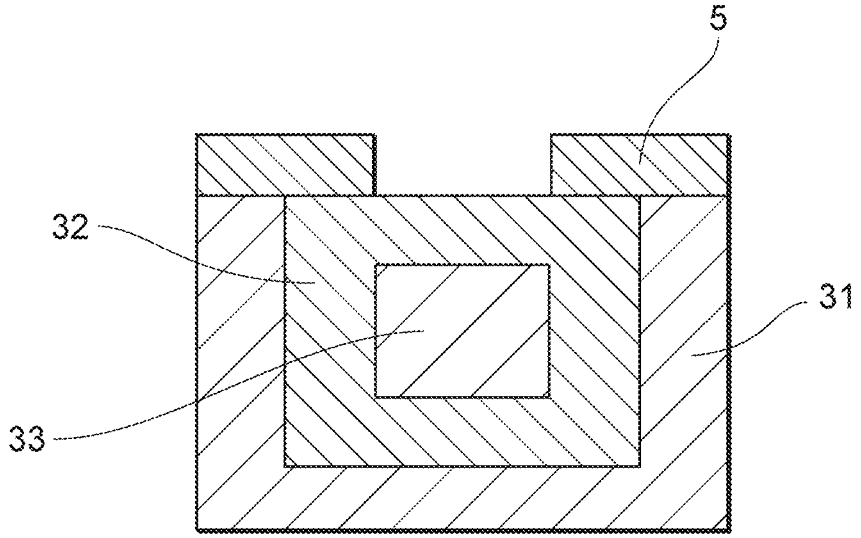
FIG. 8 is a schematic diagram showing an example of the arrangement of iron oxide and aluminum oxide according to Comparative Example 1.

1 g of the same iron oxide powder (hematite, $Fe_2O_3$, Kojundo Chemical Lab. Co., Ltd., purity: 99.9%, particle size: <1 μm) as that of Example 1 was prepared as a sample. As shown in FIG. 8, the sample 33 coated with an aluminum oxide ($Al_2O_3$) powder 32 was placed in a large crucible 31 made of aluminum oxide. The sample 33 was irradiated with microwaves under the same conditions as in Example 1; however, the temperature of the sample 33 did not exceed the measurement lower limit of the radiation thermometer, i.e., 140° C., and the sample 33 remained hematite and was not reduced.

REFERENCE SIGNS LIST

1 . . . first container, 2 . . . metal oxide, 3 . . . second container, 4 . . . high-melting-point material, 5 . . . lid, 6 . . . insulation material, 20 . . . electromagnetic wave applicator, 21 . . . chamber, 22 . . . waveguide, 23 . . . oscillator, 24 . . . inlet pipe, 25 . . . outlet pipe, 32 . . . aluminum oxide powder

The invention claimed is:

1. A method for producing a reduced form of a metal oxide, comprising irradiating a metal oxide and a high-melting-point material that is not in contact with the metal oxide with electromagnetic waves that are at least one of microwaves and millimeter waves to reduce at least a portion of the metal oxide, wherein a partition member is placed between the metal oxide and the high-melting-point material, the high-melting-point material has a melting point higher than the melting point of the metal oxide, and the high-melting-point material comprises:

an absorbent material that absorbs the electromagnetic waves in a temperature range that is at least partially lower than a temperature range in which the metal oxide absorbs the electromagnetic waves, and an insulation material that has a lower degree of absorption of the electromagnetic waves than the metal oxide, and wherein the at least a portion of the metal oxide is reduced without directly contacting a reducing agent.

2. The method for producing a reduced form of a metal oxide according to claim 1, wherein the reducing agent is a carbon-containing reducing agent.

3. The method for producing a reduced form of a metal oxide according to claim 1, wherein in the reduction of at least a portion of the metal oxide, carbon monoxide (CO) is not supplied to the metal oxide.

4. The method for producing a reduced form of a metal oxide according to claim 1, wherein the metal oxide is a powder.

5. The method for producing a reduced form of a metal oxide according to claim 1, wherein the partition member is at least a portion of a container, and in the reduction of at least a portion of the metal oxide, the metal oxide is placed inside the container, and the high-melting-point material is placed outside the container.

6. The method for producing a reduced form of a metal oxide according to claim 1, wherein the partition member is at least a portion of a container, and in the reduction of at least a portion of the metal oxide, the high-melting-point material is placed inside the container, and the metal oxide is placed outside the container.

7. The method for producing a reduced form of a metal oxide according to claim 1, wherein the metal oxide is iron oxide.

8. The method for producing a reduced form of a metal oxide according to claim 7, wherein the iron oxide is at least one selected from iron (III) oxide ($Fe_2O_3$), triiron tetraoxide ($Fe_3O_4$), and iron (II) oxide (FeO).

9. The method for producing a reduced form of a metal oxide according to claim 1, wherein the absorbent material comprises a carbon material.

10. The method for producing a reduced form of a metal oxide according to claim 1, wherein the insulation material comprises an oxide.

11. A method for producing a reduced form of a metal oxide, comprising:

placing a partition member between a metal oxide to be reduced and a high-melting-point material comprising an insulation material and an absorbent material that absorbs electromagnetic waves in a temperature range lower than an electromagnetic wave absorption rate change temperature range of the metal oxide; and irradiating the metal oxide, the high-melting-point material, and the partition member with electromagnetic waves to heat the high-melting-point material and the metal oxide, thereby causing the metal oxide to undergo a reduction reaction;

wherein the metal oxide is reduced without directly contacting a reducing agent.

12. The method for producing a reduced form of a metal oxide according to claim 11, wherein the partition member is at least a portion of a first container, the method comprising:

placing one of the metal oxide to be reduced and the high-melting-point material inside the first container, and placing the other of the metal oxide to be reduced and the high-melting-point material outside the first container, placing the first container, the metal oxide, and the high-melting-point material inside a second container, and applying the electromagnetic waves from the outside of the second container to heat the high-melting-point material and the metal oxide, thereby causing the metal oxide to undergo a reduction reaction.

13. The method for producing a reduced form of a metal oxide according to claim 11, wherein at least a portion of the metal oxide is coated with a powder.

14. The method for producing a reduced form of a metal oxide according to claim 13, wherein the powder comprises aluminum oxide.

15. The method for producing a reduced form of a metal oxide according to claim 11, wherein the absorbent material comprises a carbon material.

16. The method for producing a reduced form of a metal oxide according to claim 11, wherein the metal oxide is hematite, and the reduced form is magnetite.

17. The method for producing a reduced form of a metal oxide according to claim 11, wherein the temperature of the metal oxide is measured, and the irradiation with the electromagnetic waves is stopped when the temperature stops rising.

* * * * *